(12) United States Patent
Fischer et al.

(10) Patent No.: US 7,733,869 B2
(45) Date of Patent: Jun. 8, 2010

(54) PROVIDING VPLS-LIKE SERVICE OVER NATIVE ATM NETWORKS

(75) Inventors: John Fischer, Stittsville (CA); Shay Nahum, Ottawa (CA); Carl Rajsic, Nepean (CA); Shawn McAllister, Manotick (CA)

(73) Assignee: Alcatel-Lucent, Paris (FR)

( * ) Notice: Subject to any disclaimer, the term of this patent is extended or adjusted under 35 U.S.C. 154(b) by 1203 days.

(21) Appl. No.: 10/731,091

(22) Filed: Dec. 10, 2003

(65) Prior Publication Data

US 2005/0129024 A1 Jun. 16, 2005

(51) Int. Cl.
*H04L 12/28* (2006.01)
*H04L 12/56* (2006.01)
(52) U.S. Cl. .............................. 370/395.1; 370/395.43; 370/395.53; 370/401
(58) Field of Classification Search .............. 370/395.2, 370/395.51, 395.52, 395.1, 395.53, 905, 370/908, 389, 401, 395.54, 238.1, 238, 395.21, 370/395.3
See application file for complete search history.

(56) References Cited

U.S. PATENT DOCUMENTS

| | | | | |
|---|---|---|---|---|
| 6,041,057 | A  * | 3/2000 | Stone | 370/397 |
| 6,310,877 | B1 * | 10/2001 | Rochberger | 370/395.2 |
| 6,337,863 | B1 * | 1/2002 | Nair et al. | 370/395.53 |
| 6,434,155 | B1 * | 8/2002 | Jones et al. | 370/398 |
| 6,456,600 | B1 * | 9/2002 | Rochberger et al. | 370/255 |
| 6,640,251 | B1 | 10/2003 | Wiget | |
| 6,967,954 | B2 * | 11/2005 | Sugiyama | 370/395.52 |
| 7,113,512 | B1 * | 9/2006 | Holmgren et al. | 370/395.53 |
| 7,133,512 | B2 * | 11/2006 | Creamer et al. | 379/202.01 |
| 7,136,374 | B1 * | 11/2006 | Kompella | 370/352 |
| 7,136,386 | B2 * | 11/2006 | Allen et al. | 370/395.5 |
| 7,266,124 | B2 * | 9/2007 | Kim et al. | 370/397 |

(Continued)

FOREIGN PATENT DOCUMENTS

AU 2314100 A 4/2000

(Continued)

OTHER PUBLICATIONS

Lasserre, Marc, et al., Virtual Private LAN Services Over MPLS, VBN Working Group, Jan. 2003.

(Continued)

*Primary Examiner*—Steven H Nguyen
*Assistant Examiner*—Candal Elpenord
(74) *Attorney, Agent, or Firm*—Kramer & Amado P.C.

(57) ABSTRACT

A method and apparatus for emulating VPLS within an ATM network. Provider Edge devices are configured for VPLS connections. For each pair of provider edge devices supporting the same VPLS ID, one device establishes a virtual circuit between the pair. Thus, a full mesh of virtual circuits is established between provider edge devices, and a VPLS-like service can be offered to users without having to implement MPLS. Establishing the virtual circuits within a PNNI hierarchy maybe facilitated by each provider edge device propagating through the hierarchy an information group containing an association between the ATM address of the device and a VPLS ID, so that each provider edge device learns all ATM addresses to be associated with each VPLS ID. The method of advertising ATM addresses can be applied to other services requiring a number of interconnections between provider edge devices, such as Virtual Private Networks.

13 Claims, 6 Drawing Sheets

U.S. PATENT DOCUMENTS

| | | |
|---|---|---|
| 7,292,577 B1 * | 11/2007 | Ginipalli et al. .......... 370/395.1 |
| 7,558,274 B1 * | 7/2009 | Kinsky et al. ............ 370/395.54 |
| RE40,903 E | 9/2009 | Dolganow |
| 2002/0023163 A1 * | 2/2002 | Frelechoux et al. .......... 709/230 |
| 2002/0101870 A1 * | 8/2002 | Chase et al. ................ 370/389 |
| 2002/0124106 A1 | 9/2002 | Dolganow |
| 2002/0177221 A1 * | 11/2002 | Nishiguchi et al. ....... 435/287.2 |
| 2003/0110268 A1 * | 6/2003 | Kermarec et al. ........... 709/227 |
| 2003/0123448 A1 * | 7/2003 | Chang ..................... 370/395.1 |
| 2003/0152075 A1 * | 8/2003 | Hawthorne et al. ......... 370/389 |
| 2004/0030804 A1 | 2/2004 | Wiget |
| 2004/0037279 A1 * | 2/2004 | Zelig et al. .................. 370/390 |
| 2004/0037296 A1 * | 2/2004 | Kim et al. ............... 370/395.53 |
| 2004/0066781 A1 * | 4/2004 | Shankar et al. ............. 370/389 |
| 2004/0174887 A1 * | 9/2004 | Lee ....................... 370/395.53 |
| 2005/0027782 A1 * | 2/2005 | Jalan et al. .................. 709/200 |

FOREIGN PATENT DOCUMENTS

| | | |
|---|---|---|
| AU | 2003212151 A1 | 9/2003 |
| CA | 2367397 A1 | 9/2000 |
| CA | 2327880 A1 | 6/2002 |
| DE | 60313306 T2 | 7/2007 |
| EP | 1163762 A1 | 12/2001 |
| EP | 1488577 A1 | 12/2004 |
| WO | 0056018 | 9/2000 |
| WO | 0056018 A | 9/2000 |
| WO | 03079614 A | 9/2003 |

OTHER PUBLICATIONS

Lasserre, Marc, et al., Virtual Private LAN Services Over MPLS, VBN Working Group, Nov. 2003.

Augustyn, Waldemar, et al., Requirements for Virtual Private LAN Services (VPLS), PPVPN Working Group, Apr. 2003.

Kompella, K., et al., Virtual Private LAN Service, Network Working Group, May 2003.

Ahmed, Masuma, et al., Private Network-Network Interface Specification Version 1.1, The ATM Forum, Apr. 2002.

* cited by examiner

PROVIDING VPLS-LIKE SERVICE OVER NATIVE ATM NETWORKS

FIELD OF THE INVENTION

The invention relates to virtual private LAN services, and more particularly to implementation of these services within ATM networks.

BACKGROUND OF THE INVENTION

Virtual Private LAN Service (VPLS) is a proposed standard that would allow private local area networks (LANs) to be established over a public network. The VPLS presents an Ethernet interface to the users. Bridging is done at Provider Edge devices (PEs), such that the core public network need not know that a VPLS is being set up. The core network must simply guarantee the reachability of the VPLSs between the PEs.

VPLS as currently defined requires that the core network be a MultiProtocol Label Switching (MPLS) network. Once the PEs are configured with VPLS identifiers (IDs), the MPLS core network allows automatic advertising between the PEs. Each PE advertises to other PEs which VPLS IDs are supported by the PE, and advertises a MPLS label which other PEs can use to communicate with the PE with respect to each particular VPLS ID. As this VPLS ID to MPLS label mapping information is shared among multiple PEs that advertise the same VPLS ID, a mesh of MPLS label switched paths is generated to interconnect all the PEs involved in each VPLS.

Several service providers have already established large Asynchronous Transfer Mode (ATM) networks. In order to implement VPLS (as currently defined by the Internet Engineering Task Force) over an ATM network, service providers would have to add an MPLS signaling protocol to the ATM network, which would be costly and operationally challenging. An alternative would be to emulate VPLS over an ATM network using a mesh of virtual circuits. However, a significant problem for a service provider wishing to emulate VPLS over an existing ATM network is the inability to automatically establish the mesh of connections between PEs providing the bridging for the VPLS. ATM nodes advertise reachability information using a Private Network-Network Interface (PNNI) routing hierarchy, defined in ATM Forum Technical Committee, "Private Network-Network Interface Specification, v.1.1", af-pnni-0055.002, April 2002. Under PNNI, each ATM node belongs to a peer group. An ATM node advertises its reachability information to all nodes within its peer group, but only the peer group leader advertises this information outside the peer group. Furthermore, the information advertised by the peer group leader to nodes outside the peer group is limited. There is currently no means by which an ATM node can advertise VPLS ID support to nodes outside its peer group. This means that an owner of an ATM network cannot offer VPLS-like services to customers, without either tedious manual configuration of virtual channels for each pair of PEs and for each VPLS ID, or adding an MPLS signaling protocol to the network.

SUMMARY OF THE INVENTION

In accordance with one aspect of the invention, a method is provided for emulating Virtual Provide Local Area Network Service (VPLS) in an Asynchronous Transfer Mode (ATM) network. At a plurality of provider edge devices (PEs) a VPLS having a VPLS Identifier (ID) is configured. Information is exchanged between the PEs indicating a respective ATM address at each PE which is associated with the VPLS. For each pair of PEs, a respective virtual circuit is established between the pair of PEs using the respective ATM address of each PE as endpoints of the virtual circuit. If the PEs are arranged in a PNNI hierarchy, the information indicating a respective ATM address at each PE may be exchanged by generating a PNNI Topology State Element (PTSE) including a VPLS information group (IG), the VPLS IG indicating the VPLS ID and the ATM address to be associated with the VPLS, and flooding each VPLS IG throughout the PNNI hierarchy. Alternatively, the information may be exchanged by generating a PNNI Augmented Routing (PAR) Service IG, each PAR Service IG including the VPLS ID and the ATM address to be associated with the VPLS, and flooding the PAR Service IGs throughout the ATM network.

In accordance with another aspect of the invention, a method is provided for advertising a service having a service ID within an ATM network, the ATM network including nodes arranged in a PNNI hierarchy. At each node which supports the service, a PTSE is generated including a service IG indicating the service ID and an ATM address to be associated with the service. The service IGs are then flooded throughout the PNNI hierarchy.

In accordance with another aspect of the invention, a method is provided for emulating a VPLS at a provider edge device (PE) within an ATM network. A VPLS ID associated with the VPLS is configured at the PE, including associating an ATM address with the VPLS ID. The association between the VPLS ID and the ATM address is advertised to other nodes within the ATM network. The PE determines whether other ATM addresses within the ATM network are associated with the VPLS. For each such other ATM address, the PE determines whether the PE is to set up a virtual circuit with the other ATM address. For each such ATM address with which the PE determines it is to set up a virtual circuit, the PE sets up a virtual circuit to the ATM address.

Nodes and logical group nodes are provided for implementing the methods of the invention.

The method and apparatus of the present invention allow the operator of an ATM network to emulate VPLS without having to manually configure virtual circuits between each pair of PEs for each VPLS. By allowing nodes to advertise which VPLS IDs they support, other nodes can establish virtual circuits to those nodes and a mesh of virtual circuits can be established automatically. The only configuration needed by the operator of the network is to configure the VPLS IDs at each node. The advertising by the nodes can also be used for other types of meshes which can take advantage of automatic connection set-up, such as for Layer 3 or Layer 2 Virtual Private Networks.

BRIEF DESCRIPTION OF THE DRAWINGS

The features and advantages of the invention will become more apparent from the following detailed description of the preferred embodiment(s) with reference to the attached figures, wherein.

It will be noted that in the attached figures, like features bear similar labels.

DETAILED DESCRIPTION OF THE EMBODIMENTS

Figure 1:
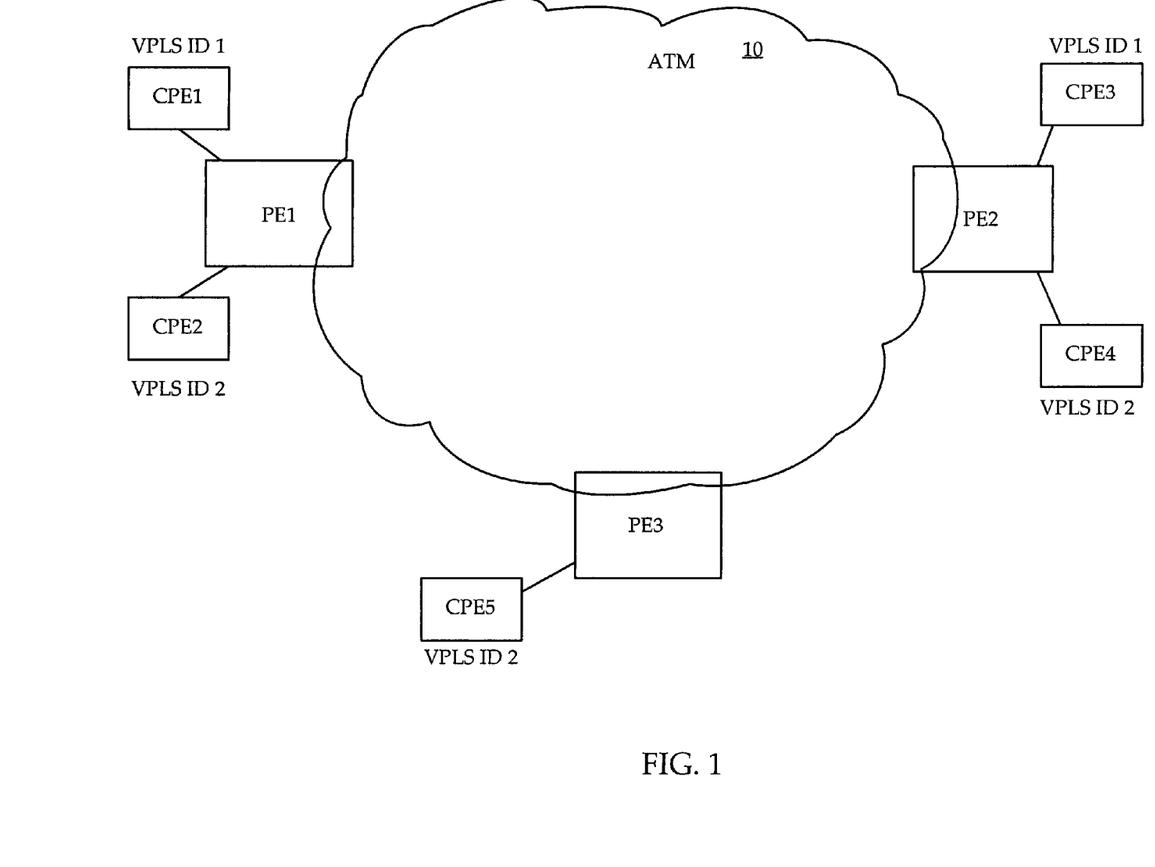
FIG. 1 is a block diagram of an example communication network.

Referring to FIG. 1, a block diagram of an example communication network is shown. The communication network has an Asynchronous Transfer Mode (ATM) network 10 as a core network. The ATM network 10 includes three Provider Edge devices (PEs), PE1, PE2, and PE3, and guarantees reachability between each pair of PEs. Each PE provides at least one Customer Premises Equipment device (CPE) with communication access to the ATM network 10. In the example network of FIG. 1, PE1 provides communication access to CPE1 and CPE2, PE2 provides communication access to CPE3 and CPE4, and PE3 provides communication access to CPE5. CPE1 and CPE3 belong to a first Virtual Private LAN Service (VPLS) having a VPLS identifier (ID) of 1. CPE2, CPE4, and CPE5 belong to a second VPLS having a VPLS ID of 2.

The network described with reference to FIG. 1 is for the purposes of example only. More generally, there are at least two PEs, each of which provides at least one CPE with communication access to the ATM network 10. The network supports at least one VPLS, at least two CPEs belonging to each VPLS. Not all CPEs on a PE need belong to a VPLS.

Broadly, a VPLS is established over the ATM network 10 by configuring each PE supporting the VPLS with the VPLS ID, exchanging between the PEs the ATM addresses associated by each PE with the VPLS, and establishing a mesh of virtual circuits interconnecting each pair of PEs supporting the VPLS.

Figure 2:
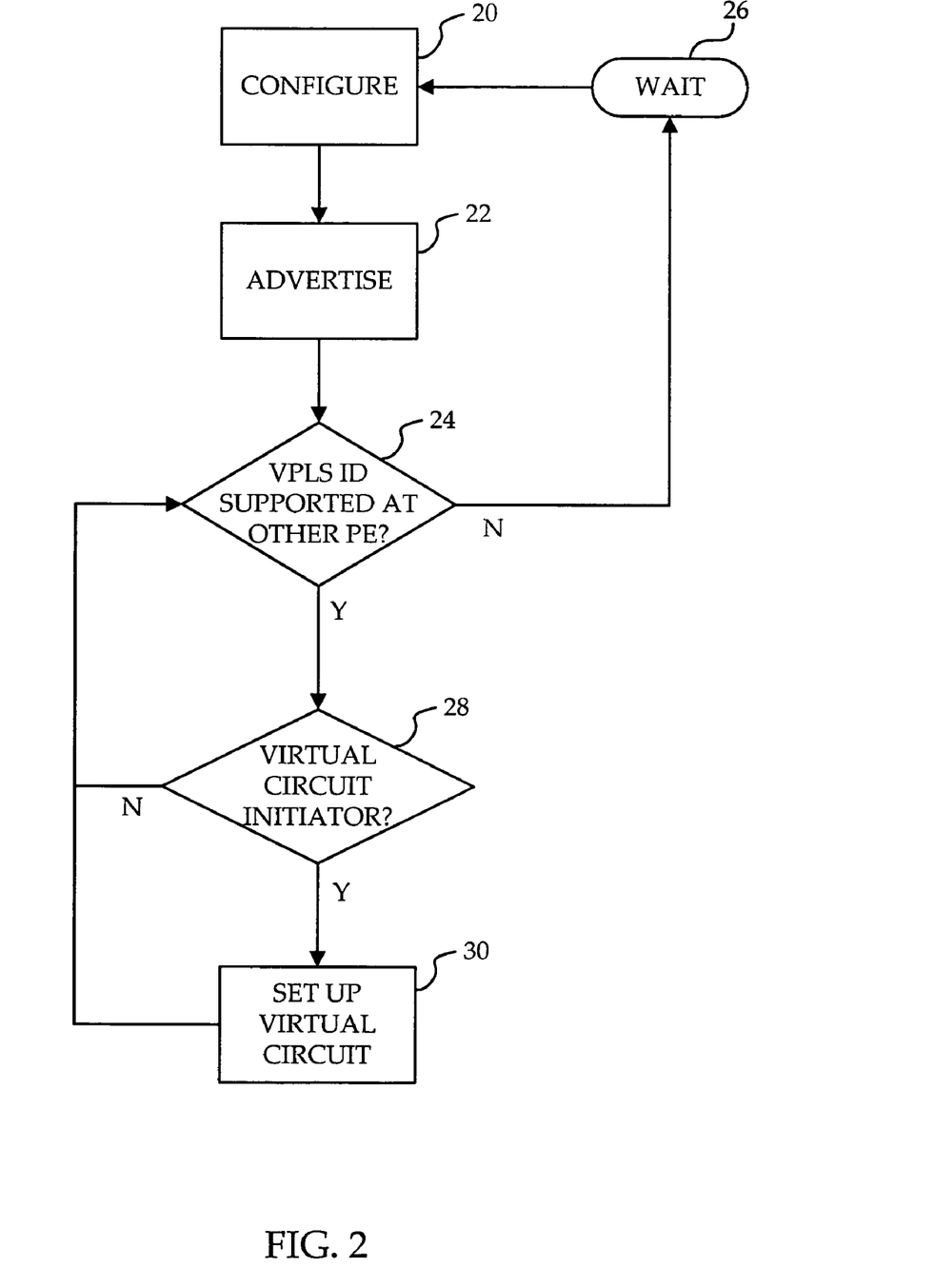
FIG. 2 is a flow chart of a method by which a Provider Edge device (PE) of FIG. 1 is configured for a VPLS according to one embodiment of the invention.

Referring to FIG. 2, a method by which each PE of FIG. 1 is configured for a VPLS according to one embodiment of the invention is shown. At step 20, a PE is configured to support a VPLS of at least one CPE for which the PE provides communication access to the network 10. In the network of FIG. 1, PE1 is first configured to support VPLS ID 1. The VPLS has a VPLS ID which is allocated a unique ATM address at the PE, and at step 22 the PE advertises the VPLS ID and the associated ATM address to other PEs within the network 10. The association between a VPLS ID and an ATM address will be referred to herein as a VPLS ID mapping, and can take any form. One method by which the PE advertises VPLS ID mappings is described below with reference to FIG. 6.

At step 24 the PE determines whether the VPLS ID is supported by any other PEs. For example, the PE may consult a database of VPLS ID mappings it has received from other PEs. The PE may conclude that the VPLS ID is not supported by any other PEs if the PE was the first PE to be configured for the VPLS ID, or if a second PE has been configured for the VPLS ID but the VPLS ID mapping advertised by the second PE has not yet reached the present PE. If the PE determines that the VPLS ID is not supported by any other PEs, then the PE enters a wait state 26. From the wait state 26, another VPLS ID can be configured at step 20, for example VPLS ID 2 for PE1.

If at step 24 the PE determines that the VPLS ID is supported by a second PE, then a new virtual circuit needs to be established between the PE and the second PE. However, since virtual circuits are bi-directional, only one of the PE and the second PE should set up a virtual circuit. At step 28 the PE determines whether it is to be an initiator of the virtual circuit. This may be determined using any method guaranteed to indicate to exactly one of the PE and the second PE that it is to be the initiator of the virtual circuit, when the method is executed by both the PE and the second PE. For example, the method could determine that the PE having the lower address is to be the initiator of the virtual circuit.

If the PE determines at step 28 that it is not to be the initiator of the virtual circuit, then the PE determines whether there are any additional PEs which support the VPLS ID at step 24. If the PE determines at step 28 that it is to be the initiator of the virtual circuit, then at step 30 the PE sets up a virtual circuit between the PE and the second PE, using the ATM address which the second PE has associated with the VPLS ID as the destination of the virtual circuit. The ATM address to be used as the destination of the virtual circuit is determined from the VPLS ID mapping advertised by the second PE. Once the virtual circuit is set up, then VPLS traffic between the PE and the second PE can be carried over the virtual circuit for traffic associated with the VPLS ID. The PE then determines whether there are any additional PEs which support the VPLS ID at step 24.

Figure 3:
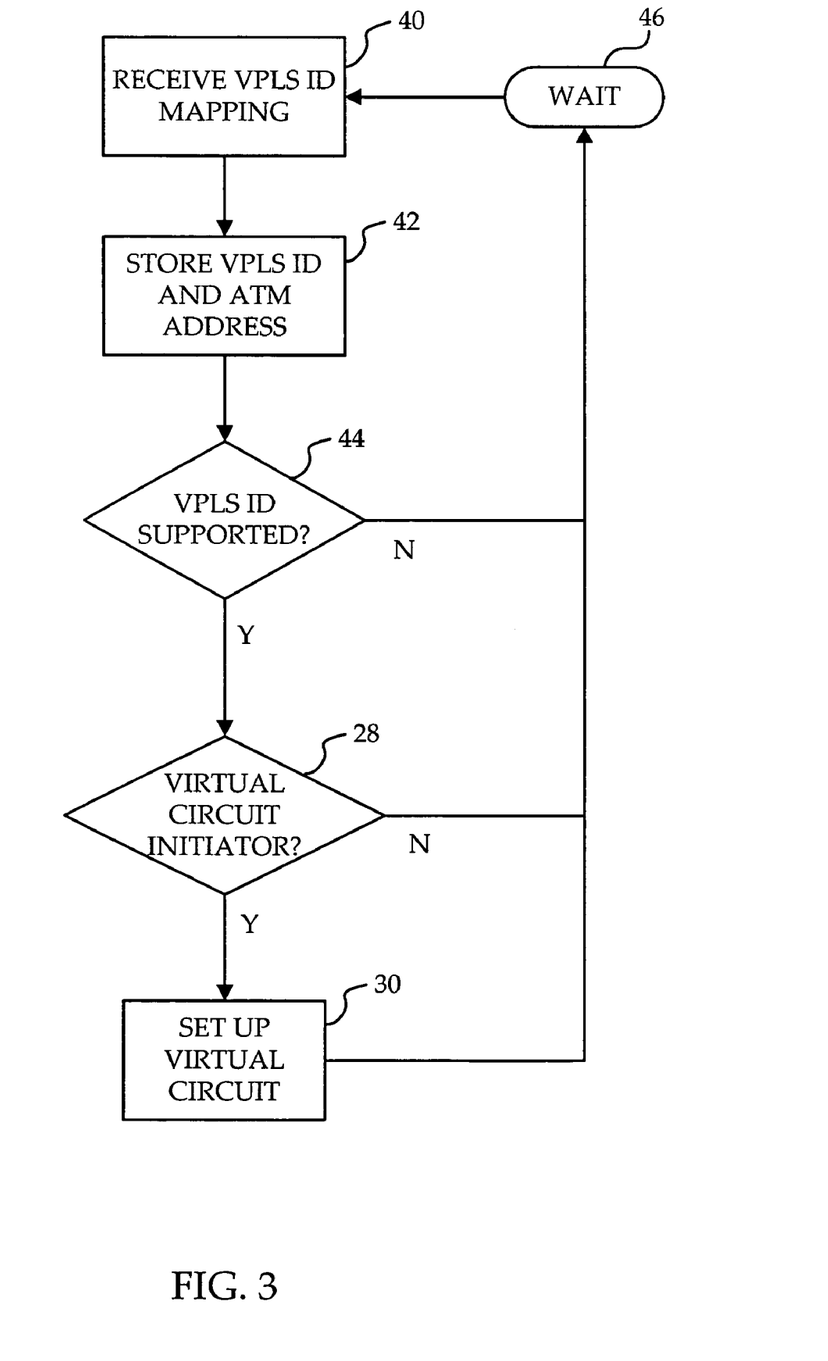
FIG. 3 is a flow chart of a method by which a PE of FIG. 1 receives and processes VPLS advertisements according to one embodiment of the invention.

As stated above, a PE may be configured and may advertise its VPLS ID mapping before it becomes aware of any other PEs which support the VPLS ID. Referring to FIG. 3, a method by which the PE receives and processes information identifying ATM addresses to be associated with a VPLS ID according to one embodiment of the invention is shown. At step 40 the PE receives a VPLS ID mapping, the VPLS ID mapping being any form of information indicating an association between an ATM address and a VPLS ID, as a result of a second PE having advertised its support of a VPLS ID as described above with reference to step 22 of FIG. 2. For example, the second PE may have advertised a VPLS ID mapping as described below with reference to FIG. 6 during configuration of the second PE. The VPLS ID mapping includes a VPLS ID and an associated ATM address.

At step 42 the PE stores the VPLS ID mapping. This is necessary because the VPLS ID may not yet be supported at the PE. If the PE is configured for this VPLS ID at a later time, then the PE will know at that time that a virtual circuit needs to be established between itself and a second PE, as described above with reference to step 24 of FIG. 2.

At step 44 the PE determines whether the VPLS ID of the VPLS ID mapping is one for which the PE is already configured. If the VPLS ID is not one for which the PE is already configured, then there is no need for a virtual circuit between the PE and the second PE, and the PE enters a wait state 46. For example, the VPLS ID mapping could have been received by PE3 of FIG. 1 from PE2, indicating an ATM address to be associated with VPLS ID 1.

If the PE determines at step 44 that the VPLS ID of the VPLS ID mapping is one for which the PE is already configured, then a virtual circuit needs to be set up between the PE and the second PE so that traffic associated with that VPLS can be communicated between the PE and the second PE. The PE determines at step 28 whether the PE is to be an initiator of the virtual circuit, as described above with reference to FIG. 2. If the PE is not to be the initiator of the virtual circuit, then the PE enters the wait state 46. If the PE is to be the initiator of the virtual circuit, then at step 30 the PE sets up a virtual circuit between the PE and the second PE, as described above with reference to FIG. 2. Once the virtual circuit is set up, then VPLS traffic between the PE and the second PE can be carried over the virtual circuit for traffic associated with the VPLS ID. The PE then enters the wait state 46.

It should be noted that the PE may receive (or learn of) more than one VPLS ID mapping at step 40, in which case the PE stores the association between ATM address and VPLS ID indicated by each VPLS ID mapping. For the sake of clarity, a single message containing more than one VPLS ID mapping is viewed logically as multiple advertisements of individual VPLS ID mappings, each VPLS ID mapping being processed in a separate loop of the wait state 46 and the step 40 of receiving a VPLS ID mapping.

Each PE includes a VPLS controller (not shown in FIG. 1). The VPLS controller comprises instructions for allowing configuration of a VPLS at the PE, and for receiving and processing VPLS ID mappings. In the preferred embodiment, the instructions are in the form of software running on a processor, but may more generally be in the form of any combination of software or hardware within a processor, including hardware within an integrated circuit. The processor need not be a single device, but rather the instructions could be located in more than one device. If in the form of software, the instructions could be stored on a computer-readable medium.

Figure 4:
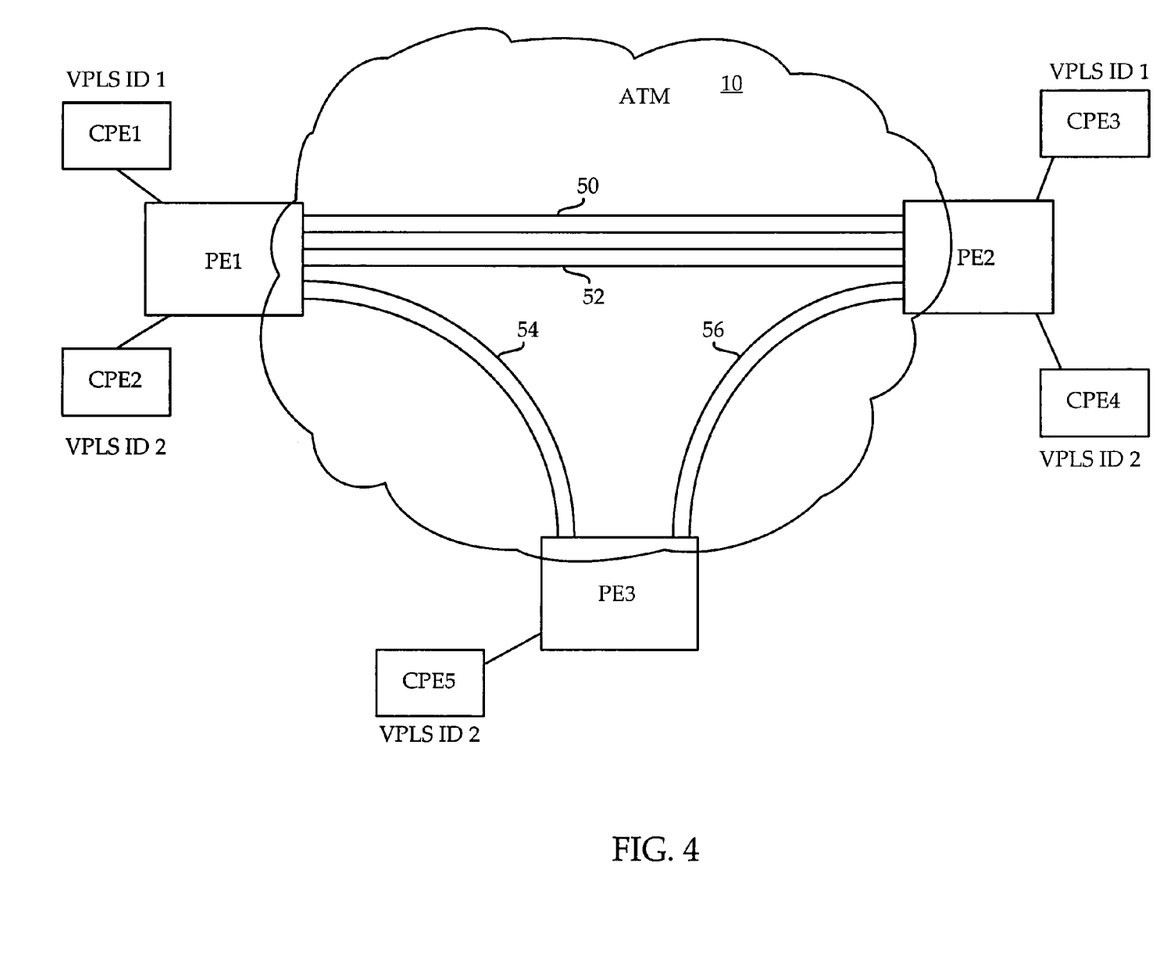
FIG. 4 is a block diagram of the network of FIG. 1 following establishment of example VPLS connections according to one embodiment of the invention.

Referring to FIG. 4, the network of FIG. 1 is shown following establishment of a mesh of interconnections in order to emulate VPLS following configuration and exchange of VPLS ID mappings as described above with reference to FIG. 2 and FIG. 3. A first virtual circuit 50 has been established between PE1 and PE2 for carrying traffic associated with VPLS ID 1. A second virtual circuit 52 has been established between PE1 and PE2 for carrying traffic associated with VPLS ID 2. A third virtual circuit 54 has been established between PE1 and PE3 for carrying traffic associated with VPLS ID 2. A fourth virtual circuit 56 has been established between PE2 and PE3 for carrying traffic associated with VPLS ID 2. All virtual circuits are bi-directional.

Figure 5:
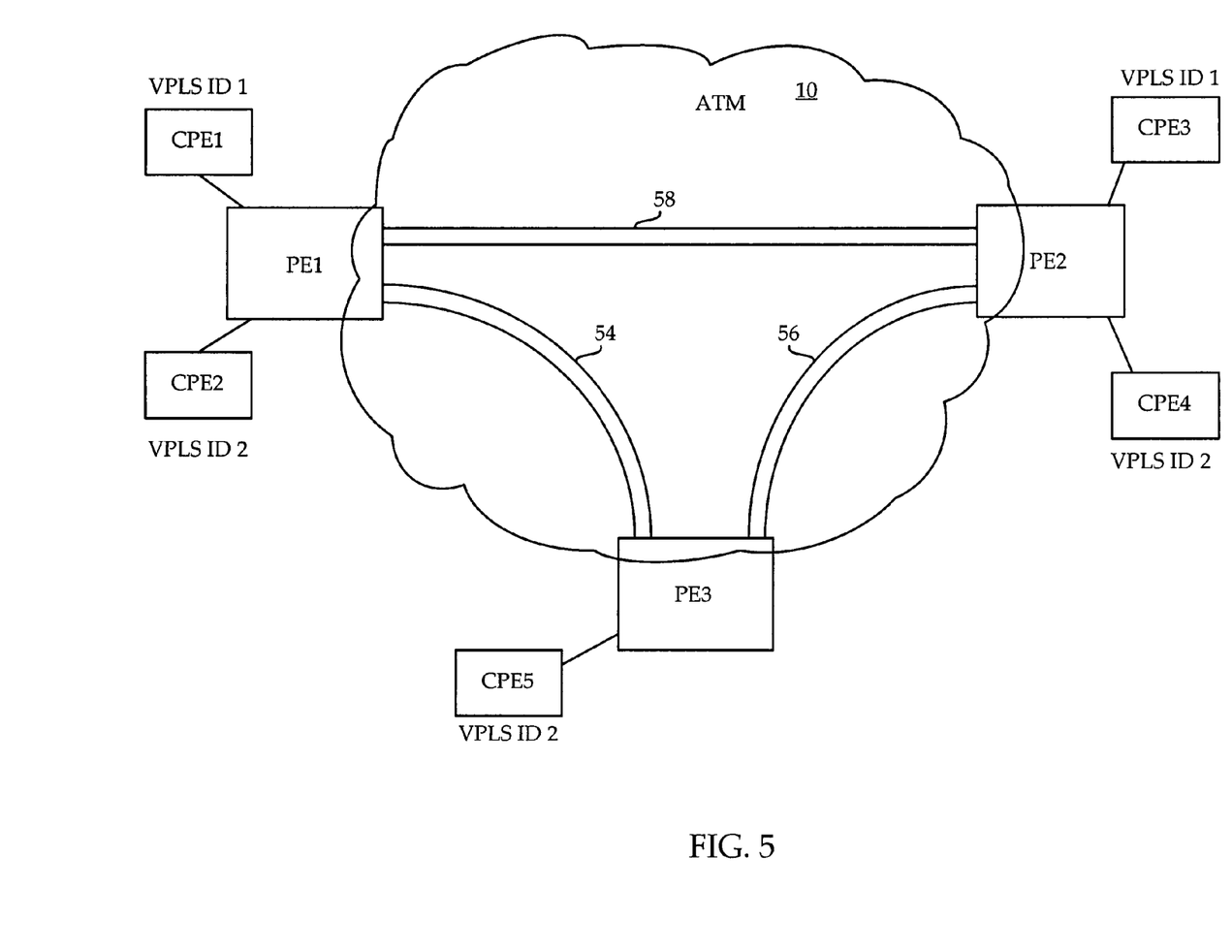
FIG. 5 is a block diagram of the network of FIG. 1 following establishment of example VPLS connections according to another embodiment of the invention.

The methods of FIG. 2 and FIG. 3 have been described with each VPLS ID being associated with a unique ATM address. In an alternative embodiment, each PE may assign a single ATM address to more than one, or even all, VPLS IDs supported by the PE. In such an embodiment, the step 30 of setting up a virtual circuit between two PEs would require that the VPLS ID be included in the virtual circuit set-up signaling as either a separate information element (IE) or as part of an existing IE. Referring to FIG. 5, the network of FIG. 1 is shown following establishment of a mesh of interconnections in order to emulate VPLS following configuration and exchange of advertisements in the embodiment in which each PE assigns a single ATM address to more than one VPLS ID. The mesh of virtual circuits is similar to that shown in FIG. 4, but the two virtual circuits 50 and 52 have been established by signaling the individual VPLS IDs 1 and 2 in both virtual circuits while they are being established. This allowed the receiver of the setup message to attach the virtual circuit to the correct VPLS ID on either PE. Including the VPLS ID in the setup message allows the destination PE to determine for which CPE or CPEs the virtual circuit is to be associated so traffic can be sent to the correct CPE.

Figure 6:
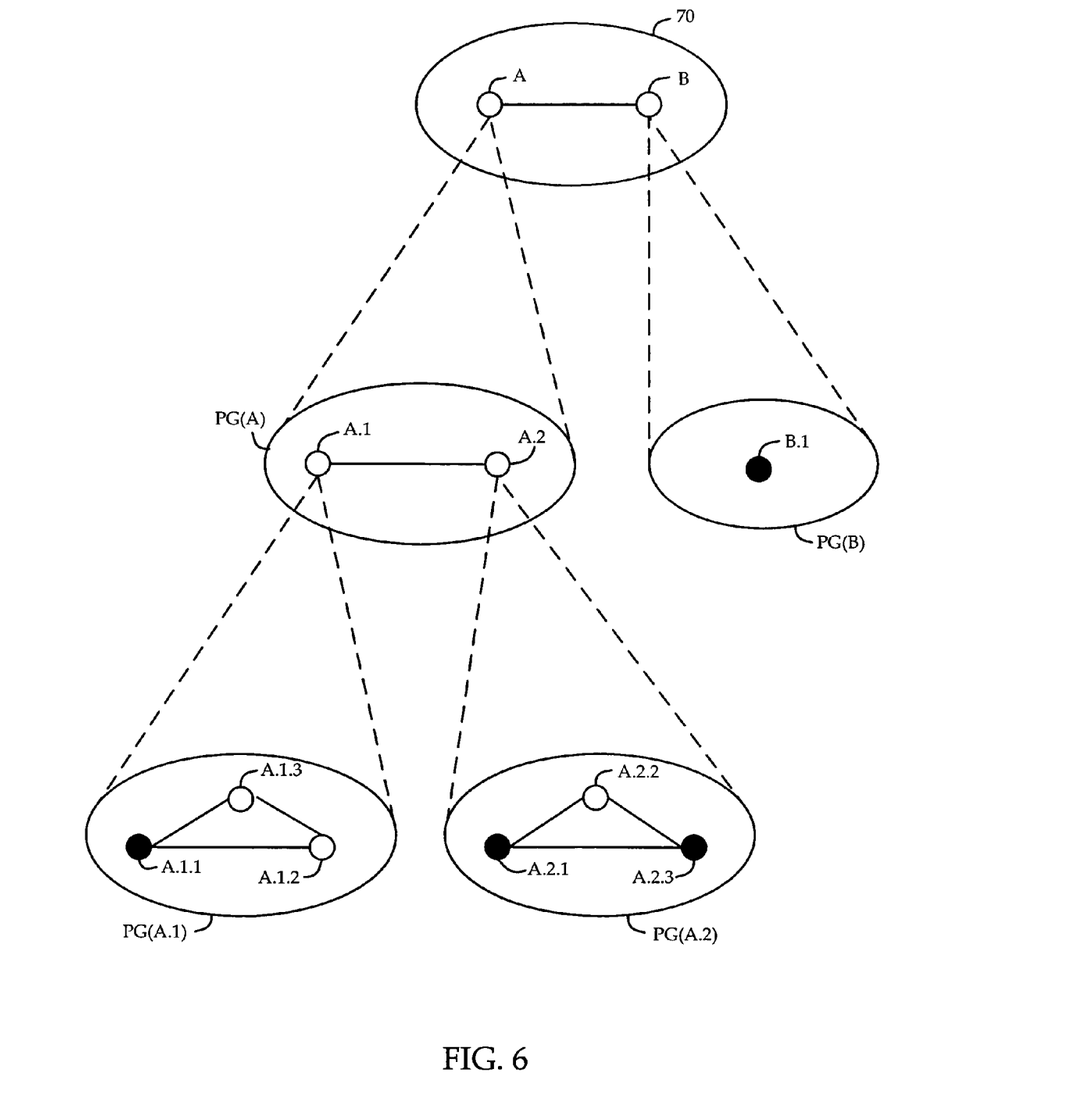
FIG. 6 is a diagram of an example set of nodes arranged in a PNNI hierarchy.

Referring to FIG. 6, an example Private Network-Network Interface (PNNI) hierarchy of nodes within the ATM network 10 of FIG. 1 is shown. Lowest level nodes A.1.1, A.1.2, and A.1.3, form a peer group PG(A.1), A.1.3 being the peer group leader. Lowest level nodes A.2.1, A.2.2, and A.2.3 form a peer group PG(A.2), A.2.2 being the peer group leader. Lowest level node B.1 forms a peer group PG(B), and is the peer group leader. Logical group nodes A.1 and A.2 form logical group PG(A), of which A.2 is the peer group leader. Logical group nodes A and B form a highest level peer group 70. Lowest level nodes A.1.1, A.2.1, A.2.3, and B.1 are configured to support a common VPLS. Each of the PEs of FIG. 1 would be a lowest level node within the PNNI hierarchy of FIG. 6, and if the common VPLS corresponded to VPLS ID 2, each of the PEs of FIG. 1 would be one of lowest level nodes A.1.1, A.2.1, A.2.3, and B.1.

In order to establish a mesh of virtual circuits to support the common VPLS, virtual circuits must be established between lowest level nodes A.1.1, A.2.1, A.2.3, and B.1, as described above with reference to FIG. 2 and FIG. 3. Each lowest level node supporting a VPLS must advertise this support, as indicated above with reference to step 22 of FIG. 2. In one embodiment of the invention, a new PNNI Topology State Element (PTSE) information group (IG) is defined for PNNI routing. Each lowest level node includes within PTSEs it advertises to its peer group a VPLS IG indicating a VPLS ID and an associated ATM address. One such VPLS IG is included for each VPLS ID supported by the node. Within each peer group (PG), the peer group leader (PGL) receives all PTSEs flooded throughout the PG. In addition to the standard PNNI summarization, the PGL extracts the VPLS IGs from the PTSEs, each VPLS IG identifying a VPLS ID mapping for a VPLS ID supported by a lowest level node within the PG. The PGL propagates the VPLS IGs up the hierarchy to its parent node via the logical group node of the PG.

Each logical group node may receive VPLS IGs from its respective PGL. Each logical group node floods these VPLS IGs throughout its own PG. The PGL of each higher level PG receives the VPLS IGs from all logical group nodes within the higher level PG, and propagates the VPLS IGs up the hierarchy to the next highest level logical group node. This repeats until the highest level group is reached, at which point all VPLS IGs have been propagated up the PNNI hierarchy. In this embodiment, the VPLS IGs provide the VPLS ID mappings advertised by the PEs (described above with reference to step 22 of FIG. 2) and received by the PEs (described above with reference to step 40 of FIG. 3).

In the example hierarchy of FIG. 6, if the common VPLS ID is "10" then the logical group node A.1 maintains the VPLS ID mapping "10, A.1.1" and passes it as a VPLS IG to LGN A.2 (the only other logical group node in its peer group). The logical group node A.2 maintains the VFLS ID mappings "10, A.2.1" and "10, A.2.3" and passes them as VPLS IGs to logical group node A.1. The logical group node A maintains the VPLS ID mappings "10, A.1.1", "10, A.2.1" and "10, A.2.3" and passes them as VPLS IGs to logical group node B. The logical group node B maintains the VPLS ID mapping "10, B.1" and passes it as a VPLS IG to logical group node A.

As with conventional PTSE flooding, each logical group node that receives mappings floods the PTSEs to each logical group node or lowest level node in its child peer group. In this way, the mappings are passed back down the hierarchy to the lowest level nodes. For example, logical group node A passes VPLS ID mapping "10, B.1" to the nodes within peer group A, namely logical group nodes A.1 and A.2. Logical group node A does not pass the VPLS ID mappings "10, A.1.1", "10, A.2.1", and "10, A.2.3" to logical group node A.1 and A.2 as these two logical group nodes are already aware of these VPLS ID mappings. Logical group node A.1 passes the VPLS ID mappings "10, A.2.1", "10, A.2.3", and "10, B.1" to the lowest level nodes within peer group A.1, namely lowest level nodes A.1.1, A.1.2, and A.1.3.

In this way, each lowest level node learns of the ATM addresses of all other nodes supporting the common VPLS ID. Upon receipt of these VPLS ID mappings, each lowest level node stores the mappings and determines whether it should establish a virtual circuit to the ATM addresses listed in the mappings, as described above with reference to FIG. 3.

In one embodiment, each lowest level node configured for a VPLS also includes in the VPLS ID mappings (such as within a VPLS IG within a PTSE) one or more traffic characteristics of traffic that will be carried within the VPLS. This may be required if a node foresees limited resources. A second node that receives a VPLS ID mapping will note the traffic characteristics within the VPLS ID mapping. If the second node is the initiator of the virtual circuit between the two nodes, then the second node will set up a virtual circuit between the two nodes which will satisfy only the minimum traffic characteristics as specified by each node. For example, if the first node advertises 100 Mbits capacity for a VPLS ID and the second node advertises 10 Mbits capacity for the same VPLS ID, then the node which sets up the virtual circuit between the nodes for the VPLS ID will set up a virtual circuit having a capacity of 10 Mbits, irregardless of which node actually is responsible for setting up the virtual circuit.

The use of IGs indicating VPLS ID mappings to allow nodes to exchange ATM addresses to be associated with a service ID can be used for any service requiring interconnections between nodes where each instance of the service has an associated identifier. Each node advertises an association between a service ID and an ATM address by including an IG identifying the association within a PTSE flooded throughout the node's peer group, and subsequently throughout the PNNI hierarchy. This allows virtual circuits to be established automatically, as described above for emulation of VPLS. For example, if a Virtual Private Network needs to be established, then each lowest level node includes in its PTSE an IG indicating an association between a VPN ID of the VPN and an ATM address to be associated with the VPN. As other nodes learn that the node supports the specified VPN at the specified ATM address, virtual circuits can be set up between pairs of nodes supporting the VPN.

In another embodiment, the advertising by PEs of support for VPLS IDs, as described broadly above with reference to step 22 of FIG. 2 and step 40 of FIG. 3, is accomplished by a modification to PNNI Augmented Routing (PAR), the conventional implementation of which is described in af-ra-0104.000, "PNNI Augmented Routing (PAR) Version 1.0", The ATM Forum Technical Committee, January 1999. In this embodiment, each PE generates a PAR Service IG according to conventional PAR, but populates the PAR Service IG with the ATM address of which the PE is associating with the VPLS ID. The PE then nests a conventional PAR VPN ID IG within the PAR Service IG, but populates the PAR VPN ID IG with the VPLS ID. The PAR Service IG thereby includes the VPLS ID mapping, the ATM address portion of the VPLS ID mapping being within the PAR Service IG itself and the VPLS ID portion of the VPLS ID mapping being within the PAR VPN ID IG nested within the PAR Service IG. A new VPLS VPN IG may also be defined by the PE and nested within the PAR VPN ID IG. The VPLS VPN IG is similar in function to the existing PAR IPv4 Service Definition IG, and includes information such as traffic descriptor information (as described above) or any other VPLS-specific information. Other encodings of the VPLS ID mapping are possible, such as embedding the VPLS ID in the VPLS VPN IG rather than in a PAR VPD ID IG.

At step 22 of FIG. 2, the PE advertises the VPLS ID mapping by propagating the PAR Service IG throughout the PNNI hierarchy using conventional PAR flooding methods. At step 40 of FIG. 3, a PE which receives a PAR Service IG extracts the VPLS ID mapping from the PAR Service IG.

In the embodiment in which PAR is used to advertise VPLS ID mappings between PEs, not all PEs need run the PNNI routing protocol. Alternatively, at least one PE can be attached to the ATM network via an ATM link running a signaling protocol such as ATMF UNI or ATMF AINI signaling, and exchange VPLS ID mappings with other PEs using Proxy PAR (described in Section 5 of af-ra-0104.000, "PNNI Augmented Routing (PAR) Version 1.0", The ATM Forum Technical Committee, January 1999). This allows PEs to advertise their VPLS ID mappings and receive the VPLS ID mappings of other PEs, thereby permitting establishment of the mesh of virtual circuits between PEs supporting a common VPLS ID, but without requiring that every PE run the full suite of PNNI routing and signaling protocols. Use of Proxy PAR also allows connectivity between any combination of PEs running PNNI (and PAR) and PEs that run Proxy PAR instead of PNNI.

The embodiments presented are exemplary only and persons skilled in the art would appreciate that variations to the embodiments described above may be made without departing from the spirit of the invention. Methods logically equivalent or similar to the methods described above with reference to FIG. 2 and FIG. 3 are within the scope of the invention. The scope of the invention is solely defined by the appended claims.

We claim:

1. A method of emulating Virtual Provide Local Area Network Service (VPLS) in an Asynchronous Transfer Mode (ATM) network, comprising:

configuring, at a plurality of provider edge devices (PEs) arranged in a Private Network-Network Interface (PNNI) hierarchy, a VPLS having a VPLS Identifier (ID);

at each PE, generating a PNNI Topology State Element (PTSE) including a VPLS Information Group (IG), the VPLS IG indicating the VPLS ID and an ATM address associated with the VPLS;

flooding each VPLS IG throughout the PNNI hierarchy to exchange information between the PEs;

establishing a mesh of virtual circuits in the ATM network to emulate VPLS by attaching virtual circuits to pairs of PEs, each of the pairs of PEs in the mesh comprising a first PE and a second PE, wherein establishing each virtual circuit between the first PE and the second PE comprises:

selecting the first PE and the second PE for the virtual circuit when the first PE determines that the second PE supports the VPLS ID;

determining whether the first PE or the second PE should initiate the virtual circuit;

automatically establishing the virtual circuit between the first PE and the second PE using the respective ATM address of each PE as endpoints of the virtual circuit, wherein the virtual circuit has a traffic characteristic equal to a minimum traffic characteristic of the first PE and the second PE.

2. The method of claim 1 wherein at each PE, the respective ATM address associated with the VPLS is unique to the VPLS.

3. The method of claim 1, wherein a second VPLS is emulated at a plurality of the PEs, and wherein at each such PE the respective ATM address associated with the VPLS is also associated with the second VPLS.

4. The method of claim 1, further comprising:
- at each PE, flooding the PTSE throughout a peer group of the PE, each peer group having a peer group leader;
- at each peer group leader, receiving each PTSE generated by a PE within the peer group of the peer group leader and flooding such PTSEs throughout a parent logical group of the peer group leader;
- at each peer group leader, receiving at least one other PTSE, each other PTSE containing a VPLS IG indicating an association between the VPLS ID and an ATM address, from the parent logical group of the peer group leader; and
- at each peer group leader, flooding the at least one other PTSE throughout the peer group of the peer group leader.

5. A method of emulating Virtual Provide Local Area Network Service (VPLS) in an Asynchronous Transfer Mode (ATM) network, comprising:
- configuring, at a plurality of provider edge devices (PEs), arranged in a Private Network-Network Interface (PNNI) hierarchy, a VPLS having a VPLS Identifier (ID);
- associating an ATM address with the VPLS ID;
- at each PE, generating a Private Network-Network Interface (PNNI) Augmented Routing (PAR) Service IG including the VPLS ID, an ATM address associated with the VPLS, and a traffic characteristic associated with both the VPLS ID and the ATM address;
- advertising the association between the VPLS ID and the ATM address to other nodes within the ATM network;
- flooding each PAR Service IG throughout the ATM network;
- establishing a mesh of virtual circuits in the ATM network to emulate VPLS by attaching virtual circuits to pairs of PEs, each of the pairs of PEs in the mesh comprising a first PE and a second PE, wherein establishing each virtual circuit between the first PE and the second PE comprises:
  - selecting the first PE and the second PE for the virtual circuit when the first PE determines that the second PE supports the VPLS ID;
  - determining whether the first PE or the second PE should initiate the virtual circuit;
  - determining other ATM addresses within the ATM network which are associated with the VPLS;
  - for each such other ATM address, determining whether the first PE or the second PE is to set up a virtual circuit with the ATM address;
  - automatically establishing the virtual circuit between the first PE and the second PE using the respective ATM address of the first PE and the second PE as endpoints of the virtual circuit, wherein the virtual circuit comprises a traffic characteristic equal to the minimum traffic characteristic of the first PE and the second PE.

6. The method of claim 5, wherein at least one other PE uses Proxy PAR to exchange with PEs ATM addresses to be associated with the VPLS.

7. The method of claim 6, wherein the at least one other PE is attached to the ATM network via an ATM link employing an ATM User Network Interface (UNI) signaling protocol.

8. The method of claim 6, wherein the at least one other PE is attached to the ATM network via an ATM link employing an ATM Inter-Network Interface (AINI) signaling protocol.

9. A method of emulating a Virtual Private Local Area Network Service (VPLS) at a Provider Edge device (PE) within an Asynchronous Transfer Mode (ATM) network, comprising:
- configuring, at the PE, a VPLS Identifier (ID) associated with the VPLS, including associating an ATM address with the VPLS ID;
- advertising the association between the VPLS ID and the ATM address to other nodes within the ATM network, including advertising at least one traffic characteristic to be associated with the VPLS ID and the ATM address;
- determining other ATM addresses within the ATM network which are associated with the VPLS;
- generating a PNNI Topology State Element (PTSE) including a VPLS information group (IG), the VPLS IG indicating the VPLS ID and the ATM address associated with the VPLS;
- flooding the PTSE throughout the peer group of the node;
- generating a Private Network-Network Interface (PNNI) Augmented Routing (PAR) Service information group (IG) including the VPLS ID and the ATM address;
- flooding the PAR Service IG throughout the ATM network; and
- establishing a mesh of virtual circuits in the ATM network to emulate VPLS by attaching virtual circuits to pairs of PEs, each of the pairs of PEs in the mesh comprising a first PE and a second PE, wherein establishing each virtual circuit between the first PE and the second PE comprises:
  - for each such other ATM address, determining whether the first PE or the second PE is to set up the virtual circuit with the ATM address;
  - selecting the first PE and the second PE for the virtual circuit when the first PE determines that the second PE supports the VFLS ID;
  - determining whether the first PE or the second PE should initiate the virtual circuit; and
  - automatically establishing the virtual circuit between the first PE and the second PE using the respective ATM address of the first PE and the second PE as endpoints of the virtual circuit, wherein the virtual circuit comprises a traffic characteristic equal to a minimum of the at least one traffic characteristic and a second traffic characteristic associated with the other ATM address.

10. The method of claim 9, further comprising:
- setting up the virtual circuit in conformance with the at least one traffic characteristic.

11. A node within an Asynchronous Transfer Mode (ATM) network, wherein the node is part of a Private Network-Network Interface (PNNI) hierarchy, comprising:
- means for receiving a Virtual Private Local Area Network Service (VPLS) identifier (ID); and
- a VPLS controller comprising a computer-readable medium encoded with instructions, the computer-readable medium comprising:
  - instructions for receiving a service identifier (ID) identifying a service;
  - instructions for generating a PNNI Topology State Element (PTSE) including a service information group (IG), the service IG indicating the service ID and an ATM address to be associated with the service;
  - instructions for flooding the service IG throughout the PNNI hierarchy by generating at least one message, each message containing at least two PTSEs;

instructions for determining other ATM addresses within the ATM network which are associated with the VPLS ID;

instructions for, for each such other ATM address, determining whether the node is to set up a virtual circuit with the other ATM address, the instructions for guaranteeing that only one virtual circuit is set up between the node and the other ATM address;

instructions for establishing a mesh of virtual circuits to emulate VPLS by attaching virtual circuits to pairs of PEs, each of the pairs of PEs in the mesh comprising a first PE and a second PE, wherein the instructions for establishing each virtual circuit between the first PE and the second PE further comprise:

instructions for selecting the first PE and the second PE for the virtual circuit when the first PE determines that the second PE supports the VPLS ID;

instructions for determining whether the first PE or the second PE should initiate the virtual circuit; and instructions for automatically establishing the virtual circuit between the first PE and the second PE using the respective ATM address of the first PE and the second PE as endpoints of the virtual circuit.

12. The node of claim 11, further comprising:

instructions for generating a PNNI Augmented Routing (PAR) Service information group (IG), the PAR service IG including the VPLS ID and the ATM address to be associated with the VPLS; and instructions for flooding the PAR service IG throughout the ATM network.

13. The node of claim 11, wherein the instructions for advertising the association between the ATM address and the VPLS ID comprise instructions for delivering the association to a second node using Proxy PAR.

* * * * *

UNITED STATES PATENT AND TRADEMARK OFFICE
CERTIFICATE OF CORRECTION

PATENT NO. : 7,733,869 B2 Page 1 of 1
APPLICATION NO. : 10/731091
DATED : June 8, 2010
INVENTOR(S) : John Fischer et al.

It is certified that error appears in the above-identified patent and that said Letters Patent is hereby corrected as shown below:

Column 10, Claim 9, line 35, change "VFLS" to "VPLS".

Signed and Sealed this

Thirteenth Day of July, 2010

David J. Kappos
*Director of the United States Patent and Trademark Office*